May 6, 1924.

A. N. DIEHL

CLEANING GASES

Filed Aug. 5, 1919

INVENTOR
A.N. DIEHL.
ATTORNEY

May 6, 1924.

A. N. DIEHL

CLEANING GASES

Filed Aug. 5, 1919 2 Sheets-Sheet 2

1,493,110

INVENTOR
A.N.DIEHL.
by D. Anthony Ursino
ATTORNEY.

Patented May 6, 1924.

1,493,110

UNITED STATES PATENT OFFICE.

AMBROSE N. DIEHL, OF DUQUESNE, PENNSYLVANIA.

CLEANING GASES.

Application filed August 5, 1919. Serial No. 315,520.

*To all whom it may concern:*

Be it known that I, AMBROSE N. DIEHL, a citizen of the United States, and resident of Duquesne, in the county of Allegheny and State of Pennsylvania, have invented certain new and useful Improvements in Cleaning Gases, of which the following is a specification.

My invention relates to the cleaning of gases by removing the dust, tar, or other finely divided solids and entrained moisture or liquids, or other impurities contained in such gases, and while not limited to such use, primarily relates to the cleaning of the combustible gases evolved in blast furnaces, coke ovens, and gas producers and similar highly heated gases used in heating hot blast stoves, for firing steam boilers, in operating gas engines, and for other industrial purposes.

One object of the invention is to provide a novel method of cleaning gases by which impurities carried in suspension therein are readily removed in a rapid, effective and economical manner.

Another object of the invention is to provide an improved method of cleaning gases whereby the impurities in a flowing column of the gases are separated and removed therefrom, and wherein the separated impurities are collected and isolated and removed from the path of the flowing gas column.

Another object of my invention is the provision of a novel method of cleaning gases whereby the impurities in a flowing stream of gases are retarded and collected for a given time and wherein the collected impurities are periodically removed from the path of the gases by a stream of gases of much greater velocity and materially less volume than that of the cleaned gases.

A further object of this invention is to provide an improved method of cleaning gases whereby the permeability of the screening or filtering medium is lessened periodically in removing collections of impurities, the time required in removing the collected impurities is reduced and the removal of collections of impurities from the path of the gases is greatly facilitated.

A still further object of my invention is to provide gas cleaning apparatus having novel means whereby the travel of impurities in suspension in the flowing column of gases is arrested, and the impurities are separated from the gases without interference with or interruption in continuity of the gas flow.

Still further objects of my invention consist in the provision of gas cleaning apparatus having the novel constructions, combinations and arrangement of parts shown in the drawings, to be more fully described hereinafter, and to be particularly specified in the appended apparatus claims.

Referring now to the drawings, forming part of this specification, Figure 1 is a diagrammatic plan showing one arrangement of apparatus constructed in accordance with my invention, and adapted for use in carrying out the method forming part of my invention.

Figure 1:
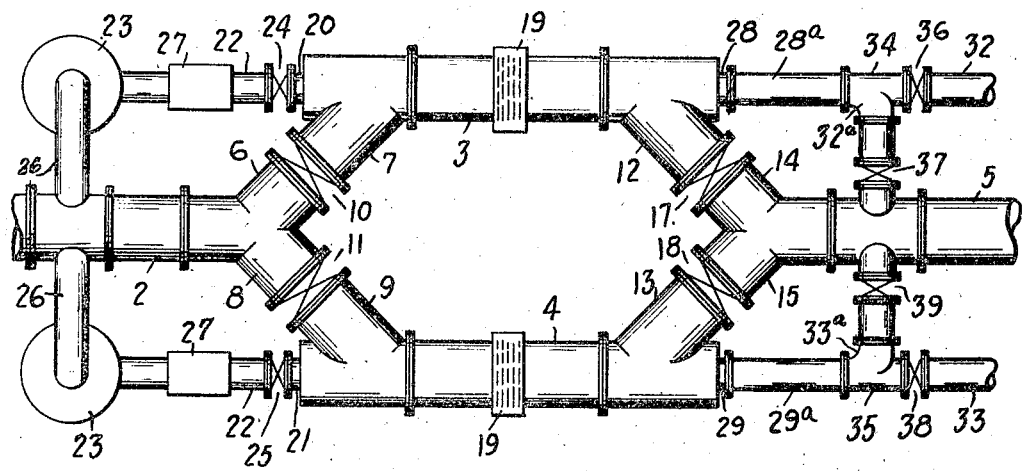
Figure 2:
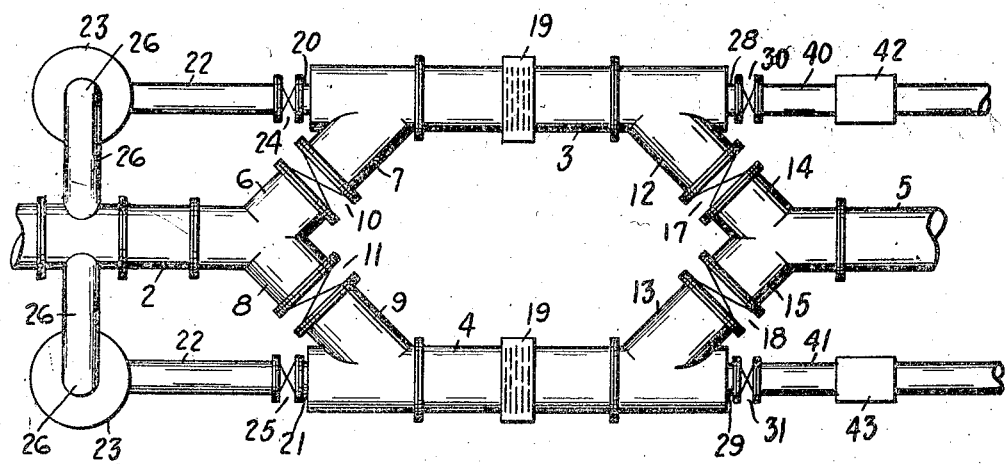
Figure 2 is a similar diagrammatic plan showing a modified form of apparatus embodying my invention and adapted for use in carrying out the method forming part of the invention.

In Figures 1 and 2 of the accompanying drawings, the numeral 2 designates the gas supply main by which the gases to be cleaned are conducted to one or the other of the two duplicate gas cleaning chambers 3 and 4, and 5 is the clean gas main into which the cleaned gases pass from the cleaning chambers 3 and 4, and through which the clean gases are led to a place of storage or use.

The discharge end of the supply main 2 is forked, one branch 6 being connected to the side inlet 7 on one end of the cleaning chamber 3 and the other branch 8 being connected to the side inlet 9 on one end of the other gas cleaning chamber 4. Suitable valves 10 and 11, which may be gate valves, enable the flow of gases from the supply main 2 to be controlled and alternately directed into the chambers 3 and 4 and, when necessary, to be entirely shut off from the chambers 3, 4.

The gas cleaning chambers 3 and 4 also are provided with side outlets 12 and 13 on one end thereof, which open into the branches 14 and 15 on the forked inlet end of the clean gas main 5, this main 5 conducting the cleaned gases from the cleaning chambers to a place of use or storage. Valves 17 and 18 on the outlets 12 and 13 regulate and control the flow of gases from the cleaning chambers 3 and 4, and when closed prevent back flow of gases into those chambers from the clean gas main 5.

Removably secured in each of the two cleaning chambers 3 and 4 is a transversely extending permeable or foraminous screen or filter 19. Manholes or openings (not shown) are provided in the side wall of the chambers 3 and 4 to permit of the removal and replacement of these screens when found necessary or desirable.

Figure 5:
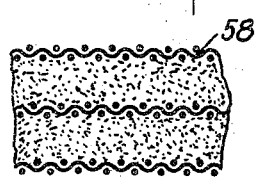
Figure 5 is a sectional plan showing details in the construction of a filtering screen adapted for use in practicing the method and forming part of my improved apparatus.

The screens or filters 19 ordinarily will be formed of a pad or biscuit of steel wool, copper or brass wool, flocculent asbestos, or asbestos fabric or a similar material not materially affected by heat, and preferably the pads will be sandwiched between layers of woven wire or wire netting having a suitable mesh, as shown in Figure 5, or in an equivalent foraminous envelope.

The screens or filters also may be constructed of a sheet of woven wire fabric or netting rolled in a spiral coil or bundle or may be made of superposed sheets of the woven wire fabric. Various other modifications may be used, the main object being to provide a construction which does not unduly obstruct the passage of the gases while presenting a large surface for the impurities to strike and become deposited upon.

Each of the cleaning chambers 3, 4, is provided on one end with a branch outlet 20 or 21 which is connected by a conduit or pipe 22 to a centrifugal separator 23. Valves 24, 25, are provided to close the branch outlets 20 and 21, and the separators are provided with outlets connected to the conduits 26. The conduits preferably connect into the gas supply main 2 at a point behind the forked outlet end thereof so as to discharge gases from the separators 23 into the gas supply main 2.

In the construction shown in Figure 1, exhausters or vacuum fans 27, 27 are provided on the conduits 22 leading from the outlets 20, 21 to withdraw gases from the cleaning chambers 3 and 4, as is done when cleaning the filtering screens 19 located in the cleaning chambers 3, 4.

The gases withdrawn from the separators in the filter cleaning operations are maintained at a higher pressure than the gases in the supply main by the exhausters 27, and therefore, will flow into the main 2, although when considered advisable or necessary, automatically operating check valves will be provided to prevent the flow of gases from the main 2 through the pipes 26 into the separators 23. The bottom of each separator will be provided with the usual outlet (not shown), through which collected impurities will be removed at intervals from the separators.

The opposite or clean gas end of each cleaning chamber 3, 4, is provided with a branch gas inlet 28 or 29, with valves 30 and 31 to control the flow of gases through these inlets.

In the construction shown in Figure 1, the branch inlets 28 and 29 on the clean gas end of the cleaning chambers 3, 4, are connected by the pipes $28^a$, $29^a$ and T's 34, 35 to air inlet pipes 32, 33, and also are connected by the branches $32^a$, $33^a$ of the T's 34, 35 with the cleaned gas main 5. Valves 36 and 37, 38 and 39, afford means for regulating and controlling the supply of gas or air drawn backwardly through the inlets 28, 29 into the gas cleaning chambers 3, 4, in cleaning the screens or filters 19 in these chambers.

In the modified construction shown in Figure 2, the branch inlets 28, 29, on the cleaning chambers are connected by pipes 40, 41 to the discharge outlet of fans or pressure blowers 42, 43, these blowers being employed to force gas or air, backwardly through the gas cleaning chambers 3, 4, at a suitably high velocity, in cleaning the filtering screens 19 by removing the collected impurities from the screens, as will be later explained.

Figure 3:
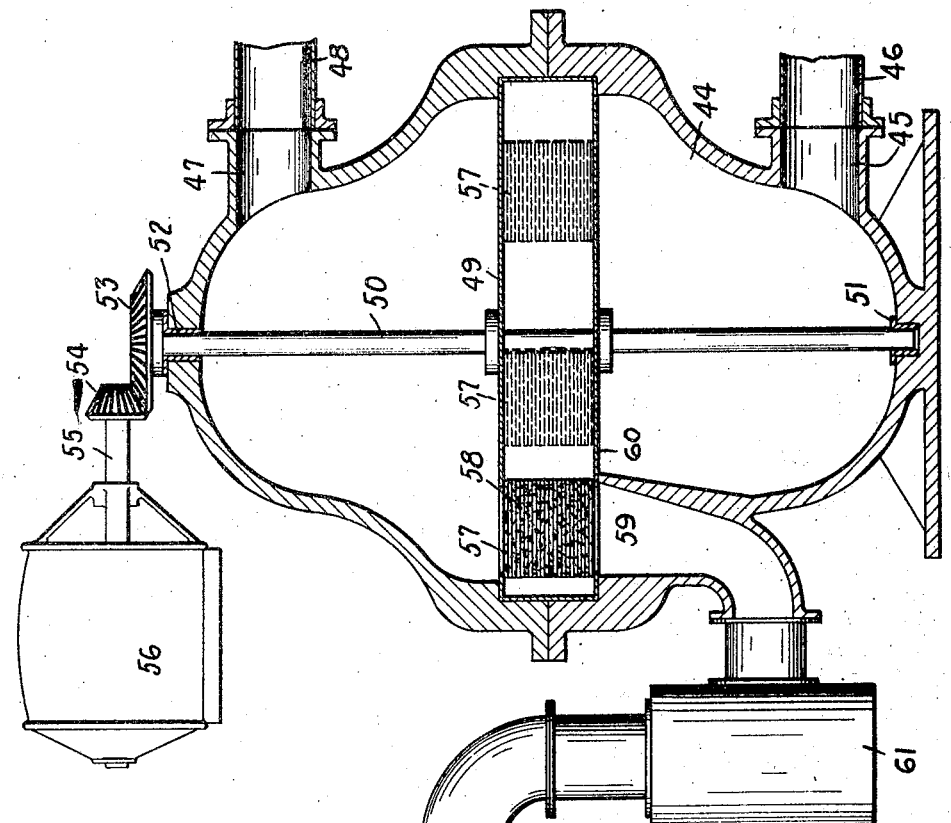
Figure 3 is a side elevation, partly in section, showing a further modification in apparatus embodying my invention, and arranged for use in carrying out the method forming part of this invention.
Figure 4:
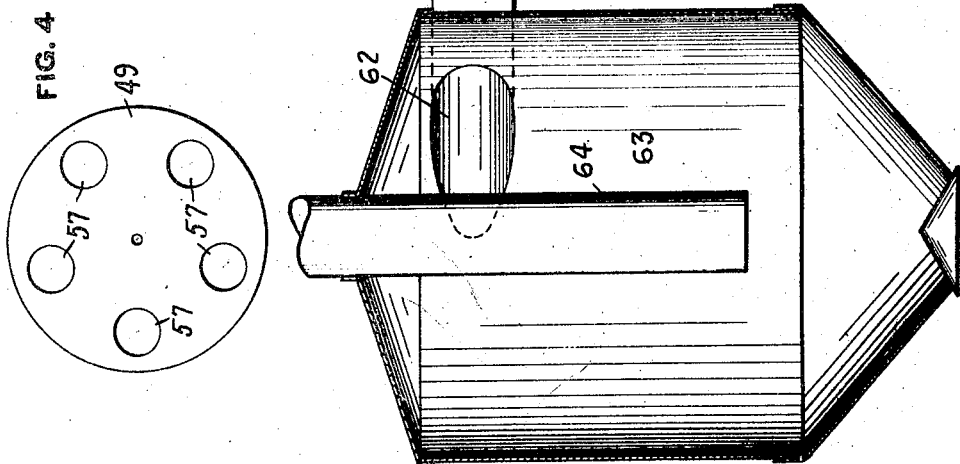
Figure 4 is a diagrammatic plan of a portion of the apparatus illustrated in Figure 3.

In the construction shown in Figures 3 and 4, the gas cleaning chamber 44 of the apparatus is provided on one end with an inlet 45 for the impurity laden gases or gases to be cleaned, the inlet being connected to the gas supply main 46, and has an outlet 47 on its other end through which the cleaned gases pass to the clean gas main 48. Rotatably secured in the cleaning chamber is a revolving diaphragm 49, this diaphragm being keyed or otherwise fastened to a vertical shaft 50 which is rotatably mounted in bearings 51, 52, in opposite ends of the chamber 44. The shaft 50 extends through one end of the cleaning chamber and is connected by bevel gears 53, 54 to the armature shaft 55 of an electric motor 56, the motor forming means by which the diaphragm is intermittently rotated in the operation of the apparatus of Figures 3 and 4.

The diaphragm 49 is provided with a series of transverse openings 57, and in each of these openings is a filtering screen 58 (see Figure 5), constructed in a similar manner to the screens 19 described in connection with the apparatus of Figures 1 and 2. The transverse openings 57 are equally spaced on a circle in the diaphragm 49, and the gas cleaning chamber 44 is provided with a suitably located branch outlet 59 which has its inlet end in close proximity to the lowermost surface 60 of the revoluble diaphragm and arranged to register with the circular row of transverse openings 58 in the diaphragm.

The discharge end of the branch outlet 59 is connected to the inlet of an exhauster or vacuum fan 61, and the discharge outlet of the exhauster is connected to the tangential inlet 62 of a centrifugal separator 63. The separator 63 has a gas outlet 64 which, preferably, is connected into the gas supply main 46 at a point behind the inlet 45 to the gas cleaning chamber 44.

In carrying out my improved method with the apparatus shown in Figures 1 and 2, the chambers 3, 4, are alternately employed in cleaning the gases, one being used to clean gases, while the screen or filter 19 in the other chamber 3 is being cleaned, this result being attained by having certain of the valves forming part of the apparatus open, while having the others closed.

Assuming that the chamber 3 of the apparatus of Figure 1 is being used to remove impurities from the gases, the valves 10 and 17, 25 and either the valve 38 or 39 will be open, and the valves 11 and 18, 24, 36 and 37 will be closed. In such case, the gases to be cleaned will pass from the supply main 2 through the branches 6 and 7, into the chamber 3, and pass from the chamber 3 through the branches 12 and 14 into the clean gas main 5. The entering gases pass through the filtering screen 19 in the chamber 3, and in penetrating the permeable filtering medium 19, are relieved of the impurities carried in suspension in the gases, the impurities being retarded and collected on the surfaces of the medium forming the screen or filter 19.

While the cleaning chamber 3 is being used to remove impurities from gases flowing therethrough from the gas main 2, the other cleaning chamber 4 will not be in operation, and advantage is taken of the interruption in the gas cleaning operation in the chamber 4 to clean the screen or filter 19 in the chamber 4. When cleaning the filter 19 in the chamber 4 one or the other of the valves 38, 39 will be opened to admit air from the air supply conduit 33 or gas from the clean gas main 5. At the same time the valve 25 will be opened and the exhauster 28 will be started in operation. This results in a current of air or gas being drawn through the chamber 4 from right to left, or in the opposite direction to that traveled by the gases during the gas cleaning operation. The exhauster 28 creates a partial vacuum in the chamber 4 and in this way the velocity of the gases or air passing backwardly through the chamber 4 is materially increased, and on account of the increased velocity of the gases or air, the impurities collected during the gas cleaning operation on the filtering screen 19 are quickly and thoroughly removed from the screen. The impurities removed from the filter or screen 19 pass from the chamber 4 through the conduit 22 and exhauster 28, and are discharged by the exhauster into the top of the centrifugal separator 23 with the exhausted gas or air, and during the passage of the exhausted gases, the impurities therein will become separated and settle in the bottom of the separator while the gases pass through the outlet into the gas conduit 26.

By materially increasing the velocity at which the gases pass backwardly through the screen 19 in removing collections of impurities therefrom, it is necessary to use only a comparatively small amount of gas. On account of the increased velocity of the gases used to remove collected impurities from the screen or filter, the volume is very much smaller than that of the gases from which the impurities are removed and the time required for the cleaning operation is very much less than is necessary to remove the impurities from the gases cleaned. For example, in cleaning 1000 cubic feet of gases at a pressure of six inches of water and having a dust content of five grains per cubic foot, approximately 5000 grains of dust will be removed and become deposited on the filtering or screening medium. Upon reversing the operation, to clean the screening or filtering medium, in blowing of 100 cubic feet of gases through the filtering medium, at say two pounds pressure, each cubic foot of the gases used for removing collected impurities from the screening medium will contain approximately fifty grains of dust. After the pressure of the cleaning gases is reduced to normalcy forty-five of the fifty grains of dust will readily become deposited by gravity. The gases emerging from the separator 23 through the conduit 26 preferably are led back into the gas supply main 2, and as the pressure of the gases discharged into the separator 23 is increased by the vacuum blower 27 to more than that of the gases flowing through the supply main 2, there is no back flow of gases from the main 2 into the conduit 26 and separator 27.

After the screen 19 in the chamber 3 has collected enough impurities on the surfaces thereof to clog the screen or impede the passage of gases therethrough, the valves 10 and 17, 25 and the open one of the valves 38, 39, will be closed, and the valves 11 and 18, 24 and one or the other of the valves 36, 37, will be opened and in this way gases will be delivered from the gas supply main 2 through the branches 8 and 9 into the cleaning chamber 4, and after passing through the filtering screen 19, will pass through the branches 13 and 15 into the clean gas main 5. At the same time, clean gases will be drawn through the cleaning chamber 3 by the vacuum blower or exhauster 27 into the other of the centrifugal separators 23, and the gases in the separator 23 after the impurities are removed, will be led through the outlet into the conduit 26 and from the conduit into the supply main 2 or, in some cases, as when air is used for cleaning the filtering screen 19, will be allowed to be discharged into the atmosphere.

With the apparatus shown in Figure 2, the method of operation will be the same as has been described, except that the pressure blowers 42 and 43 are employed in place of the exhausters 27 in supplying the gases used in cleaning the filtering screens 19. With this apparatus the chamber 3 is used alternately with the chamber 4 in cleaning gases, the unused chamber being cleaned while not employed in cleaning gases in the same manner as has been described, the gas cleaning and screen cleaning operations being reversed as in using the apparatus of Figure 1.

In practicing my method with the apparatus of Figures 3 and 4, the impurity laden gases are delivered by the gas supply main 46, through the inlet 45 into the bottom of the cleaning chamber 44, and pass through the screen 58 in the series of openings 57 in the diaphragm 49 within the cleaning chamber. The cleaned gases after passing through the series of filtering screens pass through the discharge outlet 48 into the clean gas main 48 and are led thereby to a place of use or storage. It will be noted that one of the series of filtering screens 58 in the apparatus of Figures 3 and 4 always is in register with the branch outlet 59 in the chamber, and while in such position the screen 58 is cleaned and impurities collected thereon are removed.

When a screen is to be cleaned, the exhauster 61 is started in operation to create a partial vacuum in the branch outlet 59 so as to cause the gases to flow from the upper end of the cleaning chamber 44 through the particular screen 58 being cleaned into the barrel outlet 59, and after passing through the exhauster 61 the gases used in cleaning the screens are discharged into the centrifugal separator 63.

The gas is withdrawn through the screen 58 in the reverse direction to that in which the gas travels when being cleaned, and preferably at very much increased velocity, and effectively removes all of the impurities collected on the screen. (See Figure 3).

After one of the screens 58 is cleaned, as has been described, the intermittently operating motor 56 is started so as to move the next of the series of screens in the diaphragm 49 into position in register with the cleaning outlet 59, and the screen cleaning operation is repeated in the same manner as has been described. The series of screens in the partition are then successively cleaned and as cleaned are put into use in removing impurities from the gases. In this way a continuous gas cleaning and filter cleaning operation is maintained, so that there is no interruption whatever in removing impurities from the gases in order to clean the screens by removing collected impurities therefrom.

The advantages of my invention will be apparent to those skilled in the art. Many modifications in the construction and arrangement of the apparatus used in carrying out my improved method may be made. The screens or filters may be constructed to vary the permeability of the filtering medium so as to lessen the resistance to the passage of the gases during the cleaning operations and facilitate the removal of the impurities on the screening or filtering medium, and other changes may be made.

I claim:—

1. The method of cleaning gases which consists in passing a flowing column of gases through a filtering medium and thereby retarding and arresting impurities in the gases without interruption in the flow of gases through the filtering medium, periodically stopping the flow of uncleaned gases through portions of said filtering medium and passing a reverse flow of the cleaned gases through said portions of said filtering medium, at a materially higher velocity than said uncleaned gases to remove collected impurities from the filter, and separating the impurities from said reversed flow of gases.

2. Apparatus for cleaning gases comprising a gas supply main having two branches, each of said branches leading to an independent cleaning chamber, a clean gas main having branches connected to each of said cleaning chambers, valves in each of said branches for cutting off the flow of gas therethrough, filters in each of said cleaning chambers, adapted to retard and arrest impurities in the gases, means for withdrawing gas from said clean gas main and forcing it in a reverse direction through said filters at a higher velocity than the gases to be cleaned are passed through said chambers, to remove collected impurities from the filters, means for separating the impurities from the withdrawn gases, and means for directing the withdrawn gases after cleaning thereof into the gas supply main.

In testimony whereof, I have hereunto set my hand.

AMBROSE N. DIEHL.